(12) United States Patent
Washihira

(10) Patent No.: US 7,419,386 B2
(45) Date of Patent: Sep. 2, 2008

(54) ELECTRICAL JUNCTION BOX

(75) Inventor: Kenichi Washihira, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 2 days.

(21) Appl. No.: 11/519,143

(22) Filed: Sep. 12, 2006

(65) Prior Publication Data

US 2007/0145050 A1 Jun. 28, 2007

(30) Foreign Application Priority Data

Dec. 28, 2005 (JP) ............................ 2005-377293

(51) Int. Cl.
*H01R 9/09* (2006.01)
(52) U.S. Cl. ...................... 439/76.2; 439/213; 439/949; 361/775
(58) Field of Classification Search ................ 439/76.2, 439/76.1, 213, 949; 361/775, 772
See application file for complete search history.

(56) References Cited

U.S. PATENT DOCUMENTS

| | | | | |
|---|---|---|---|---|
| 5,764,487 | A * | 6/1998 | Natsume ..................... | 361/775 |
| 6,419,516 | B1 * | 7/2002 | Parcet ........................ | 439/364 |
| 6,905,348 | B2 * | 6/2005 | Naitou et al. .............. | 439/76.2 |
| 7,108,519 | B2 * | 9/2006 | Tomikawa et al. ......... | 439/76.2 |
| 2004/0209494 | A1 * | 10/2004 | Miquel et al. .............. | 439/76.2 |

FOREIGN PATENT DOCUMENTS

| | | |
|---|---|---|
| JP | A 9-23536 | 1/1997 |
| JP | A 11-333739 | 12/1999 |
| JP | A 2002-78157 | 3/2002 |
| JP | A 2004-140200 | 5/2004 |
| JP | A 2005-150633 | 6/2005 |

\* cited by examiner

*Primary Examiner*—Hien Vu
(74) *Attorney, Agent, or Firm*—Oliff & Berridge, PLC (57) ABSTRACT

An electrical junction box that prevents deformation of a casing and breakage of a printed board due to an inserting force of a connector or the like is provided. A printed board is contained in a lower casing member. A bus bar laminated element is contained in the lower casing member above the printed board. An electrical component containing section including juxtaposed connector containing portions is provided on an upper side of an upper casing member above the bus bar laminated element. The upper casing member is mounted on the lower casing member. An upper reinforcement rib extends down from a lowermost stage insulation plate in the bus bar laminated element at a location below the electrical component containing section. The upper reinforcement rib is inserted into a through-hole in the printed board to extend down toward a bottom surface of the lower casing member. A lower reinforcement rib extends up from the bottom surface of the lower casing member to oppose the upper reinforcement rib. The upper and lower reinforcement ribs contact each other.

16 Claims, 5 Drawing Sheets

ELECTRICAL JUNCTION BOX

CROSS-REFERENCE TO RELATED APPLICATION

This application claims priority from Japanese Patent Public Disclosure JP-A-2005-377293, filed Dec. 28, 2005, the contents of which are incorporated herein by reference in their entirety.

BACKGROUND

The invention relates to an electrical junction box, and particularly to an electrical junction box that can prevent deformation of the box body due to stress caused by a plug-in operation of electrical components and prevent breakage of a circuit pattern due to the deformation.

Currently, motor vehicles require an increasing number of electrical components to be mounted on the vehicle in connection with requirements for high performance. These increases further require greater numbers of mounting locations and poles of connectors. Simultaneously, the electrical components require downsizing. An example of an electrical junction box to be mounted on, for example, a motor vehicle is disclosed in Japanese Patent Public Disclosure JP-A-2002-78157 and shown in FIG. 6 as an electrical junction box 1. The electrical junction box 1 includes an upper casing member 2 and a lower casing member 3 that can be coupled to each other. An interior space defined by the upper and lower casing members 2 and 3 contains a bus bar laminated element 4, in which current-carrying bus bars and insulation plates are alternately laminated together and with a flexible printed board 5 and a printed board 6.

Figure 6:
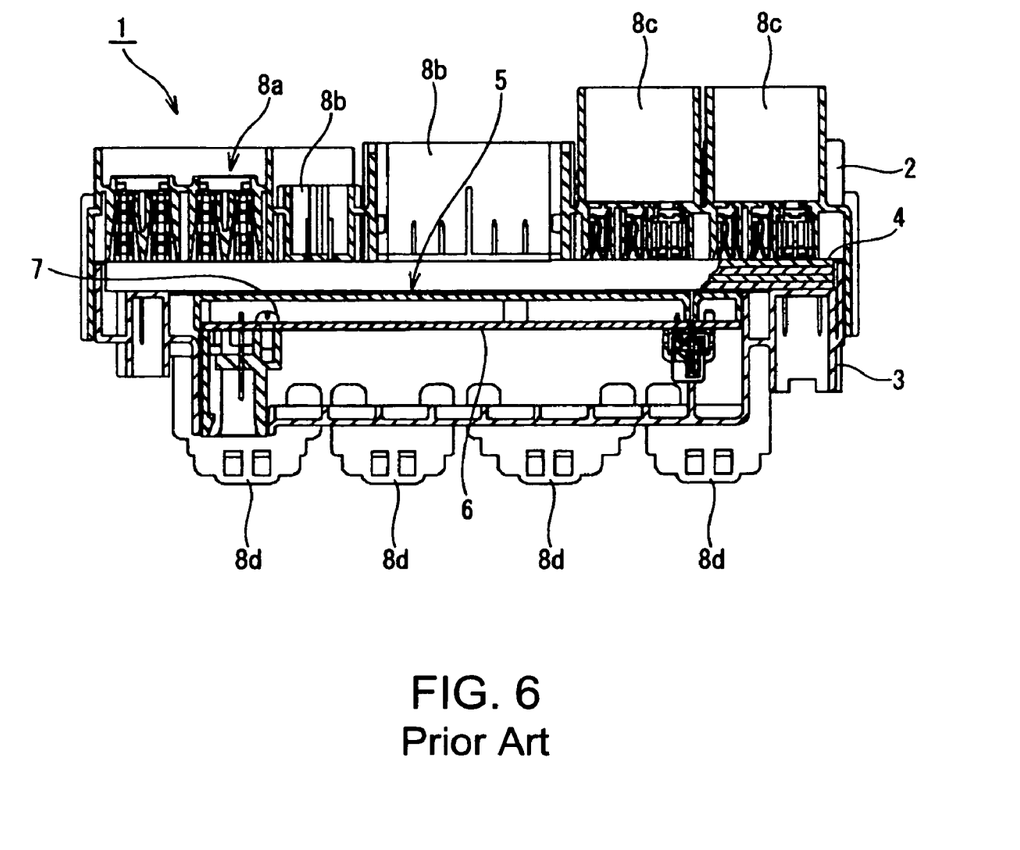
FIG. 6 is a schematic section view of a conventional electrical junction box.

The bus bar laminated element 4, flexible printed board 5, and printed board 6 are secured to the upper casing member 2 or the lower casing member 3 by a screw 7 or similar fastening device after they are positioned in the casing members.

A fuse containing section 8a, a connector containing section 8b, and a relay containing section 8c are provided on an upper side of the upper casing member 2. A plurality of connector containing sections 8d are also provided on a rear side of the lower casing member 3. Fuses, connectors, and relays (not shown) are attached to and fitted in the respective electrical component containing sections 8a to 8d and contacted with conductors of the bus bar laminated element 4, the flexible printed board 5, or the printed board 6 to complete an electrical connection.

SUMMARY

However, when the fuses, connectors or relays are inserted into and fitted in the electrical component containing sections 8a to 8d, the upper casing member 2 or the lower casing member 3 is subject to stress, thereby potentially deforming the casing member 2 or 3 inward. This may cause a failure in fitting the casing members 2 and 3 together, and further affect the flexible printed board 5 and printed board 6 contained in the casing members. A force sufficient for fitting or inserting the fuses, connectors and relays into the containing sections thus may not be able to be added to the fuses, connectors or relays, resulting in incomplete insertion of the components. Such incomplete insertion of the fuses, connectors or relays may cause a failure in connecting, or fitting, the components in the containing sections. Furthermore, if the casing is deformed when fitting or inserting the components, terminal holes in the containing sections, such as the connector containing sections, provided on the casing members may be shifted from tabs projecting from the bus bars or the printed boards, thereby causing the tabs to be deformed.

In view of the above problems, an object of the present invention is to provide an electrical junction box provided with a structure that can prevent a casing from being deformed due to stress caused when an electrical component such as a connector is inserted into and connected to an electrical component-containing portion of a containing section provided on a casing surface of the electrical junction box.

In order to address the above problems, various exemplary embodiments provide an electrical junction box comprising: a casing including a lower casing member and an upper casing member adapted to be mounted on the lower casing member; a printed board contained in the lower casing member; a bus bar laminated element including bus bars and insulation plates and contained in the upper casing member above the printed board; a containing section having juxtaposed containing portions for electrical components including connectors, fuses, and/or relays and provided on an upper side of the upper casing member above the bus bar laminated element; an upper reinforcement rib extending down from a lowermost stage insulation plate in the bus bar laminated element at a location below the containing section, the upper reinforcement rib being inserted into a through-hole in the printed board to extend down toward a bottom surface of the lower casing member; and a lower reinforcement rib extending upward from the bottom surface of the lower casing member to oppose the upper reinforcement rib; the upper and lower reinforcement ribs being coupled and secured to each other.

Also, various exemplary embodiments provide an electrical junction box comprising: a casing including a lower casing member and an upper casing member adapted to be mounted on the lower casing member; a printed board contained in the lower casing member; a bus bar laminated element including bus bars and insulation plates and contained in the upper casing member above the printed board; a containing section having juxtaposed containing portions for electrical components including connectors, fuses, and/or relays and provided on an upper side of the upper casing member above the bus bar laminated element; an upper reinforcement rib extending down from a rear side of the upper casing member at a location below the containing section through the bus bar laminated element and printed board toward a bottom surface of the lower casing member; and a lower reinforcement rib extending up from the bottom surface of the lower casing member to oppose the upper reinforcement rib; the upper and lower reinforcement ribs being coupled and secured to each other.

In the above embodiments, since the upper and lower reinforcement ribs are coupled to each other and provided on a location below the containing section for the electrical components, such as connectors may bear the stress caused when the electrical components are inserted into and fitted into the containing section, and may prevent the upper casing member from being significantly deformed. In this manner, it is possible to prevent or reduce breakage of the printed board or electrical components and incomplete insertion of the electrical components.

Even if the upper casing member is subjected to a stress caused by insertion of the connectors or other components, the upper casing member should not deformed based on inclusion of the upper reinforcement rib, which extends down from the upper casing member above the printed board or from the insulation plate in the bus bar laminated element. Since any deflection of the upper casing member should not reach the printed board, it is possible to reduce the possibility that the wiring pattern on the delicate printed board may be broken.

In a conventional electrical junction box, a printed board is positioned with respect to only one of the casing members by a single positioning hole. However, according to the above exemplary structures, it is possible to precisely position the printed board with respect to both of the upper and lower casing members, or both of the lower casing member and the bus bar laminated element, through only a single through-hole. Furthermore, it is possible to complete the work of fixing the printed board on the lower casing member by coupling the lower reinforcement rib to the upper reinforcement rib penetrating the printed board. Accordingly, it may be possible to simultaneously enhance efficiency and accuracy in electrical junction box assembly work while reducing the number of the through-holes, and downsizing the electrical junction box.

The above connecting and fixing method may utilize a press-fitting means, a screw means, or other similar means. In any connecting means, the strength of the upper reinforcement rib may be enhanced by forming the rib into a tubular body having an open lower end or by forming an internal threaded hole in the open lower end thereof.

Although it is preferable that the upper and lower reinforcement ribs are coupled to each other by a screw so that the ribs cannot be shifted relative to each other, it is sufficient that a lower end surface of the upper reinforcement rib is merely brought into contact with an upper end surface of the lower reinforcement rib to provide reinforcement for stress.

The upper reinforcement rib extending down from the upper casing member, or from the insulation plate in the bus bar laminated element, may be provided on a location below an area between a plurality of multi-pole connector containing portions and juxtaposed on the upper side of the upper casing member, so that the upper and lower reinforcement ribs may bear a stress caused when multi-pole connectors are inserted into and fitted in the multi-pole connector containing portions.

In an embodiment where a single upper reinforcement rib is provided on a space between multi-pole connectors, it is preferable that the reinforcement rib be provided near a center of the space between the multi-pole connectors in a lengthwise direction. In an embodiment where plural upper reinforcement ribs are provided on a space between the multi-pole connectors, it is preferable that the ribs are spaced uniformly away from each other.

Thus, it is possible to effectively prevent or reduce deformation of the casing that is subject to a particularly large stress when inserting and fitting the multi-pole connector into the containing section.

Since the upper and lower reinforcement ribs are disposed on an area that is subject to an inserting pressure by the connector or other components, it is possible for the ribs to effectively bear the inserting stress without increasing the number of the reinforcement ribs. Furthermore, since the number of the through-holes in the printed board can be reduced, it is possible to limit upsizing of the printed board and the electrical junction box due to wiring for diverting the through-holes.

A positioning rib may extend down from the rear side of the upper casing member to penetrate the bus bar laminated element and may be inserted into a hole in the printed board and secured to the printed board by a fixing means.

In such an embodiment, since a single hole can serve as a positioning hole and a fixing hole, it is possible to reduce the number of holes to be formed in the printed board and to enhance efficiency in wiring.

Furthermore, it may be preferable that a pushing rib extends down from the lowermost stage insulation plate in the bus bar laminated element to contact with an upper side of the printed board, thereby defining a given space between the lowermost stage insulation plate and the printed board.

Thus, it is possible to reduce the possibility that the wiring pattern on the printed board may be broken by insertion of the connectors or the like.

As described above, in various embodiments, since the upper and lower reinforcement ribs are coupled to each other at a location below the electrical component containing portions, upper and lower reinforcement ribs can bear the stress caused when inserting and fitting the connectors or similar components into the containing portions, thereby limiting deformation of the casing and resulting damage to the printed board.

Also, only a single through-hole in the printed board may be utilized to position both of the upper and lower casing members, or both of the lower casing member and the bus bar laminated element, making it possible to enhance precision in positioning the printed board with respect to the lower casing member. It is also possible to prevent terminal holes in the connector containing portions on the upper casing member and terminals extending up from the printed board from being shifted relative to each other, thereby preventing or reducing deformation of the terminals.

Furthermore, the process of positioning and fixing the printed board with respect to the lower casing member, or with respect to the upper and lower casing members, can be completed simultaneously. Accordingly, it is possible to enhance workability and accuracy in assembling the electrical junction box.

These and other objects, advantages and features are described in or apparent from the following detailed description.

BRIEF DESCRIPTION OF THE DRAWINGS

Exemplary embodiments will be described in connection with the attached drawings, in which like numerals represent like parts, and in which.

DETAILED DESCRIPTION OF EMBODIMENTS

Referring now to the drawings, embodiments of the present invention will be described below.

Figure 1:
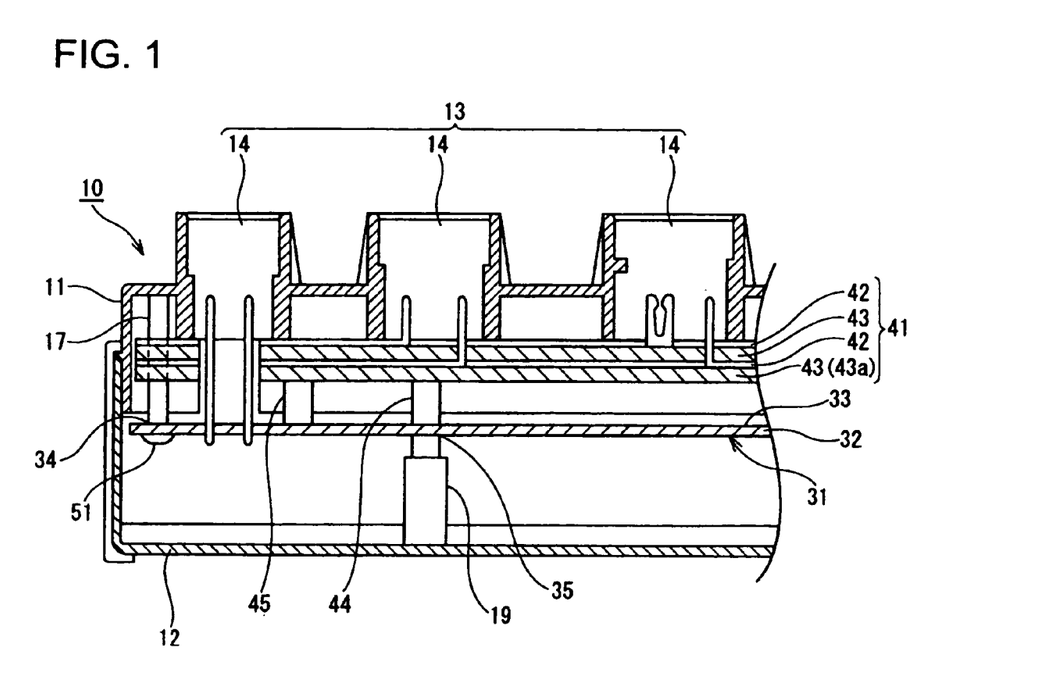
FIG. 1 is a schematic section view of a first embodiment of an electrical junction box.
Figure 2:
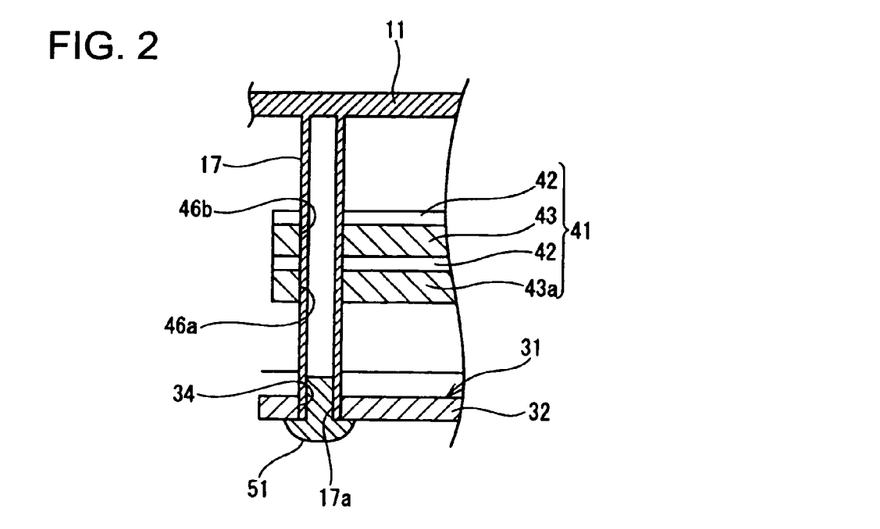
FIG. 2 is an enlarged section view of a positioning rib in the electrical junction box shown in FIG. 1, illustrating a fixing condition of the positioning rib.
Figure 3:
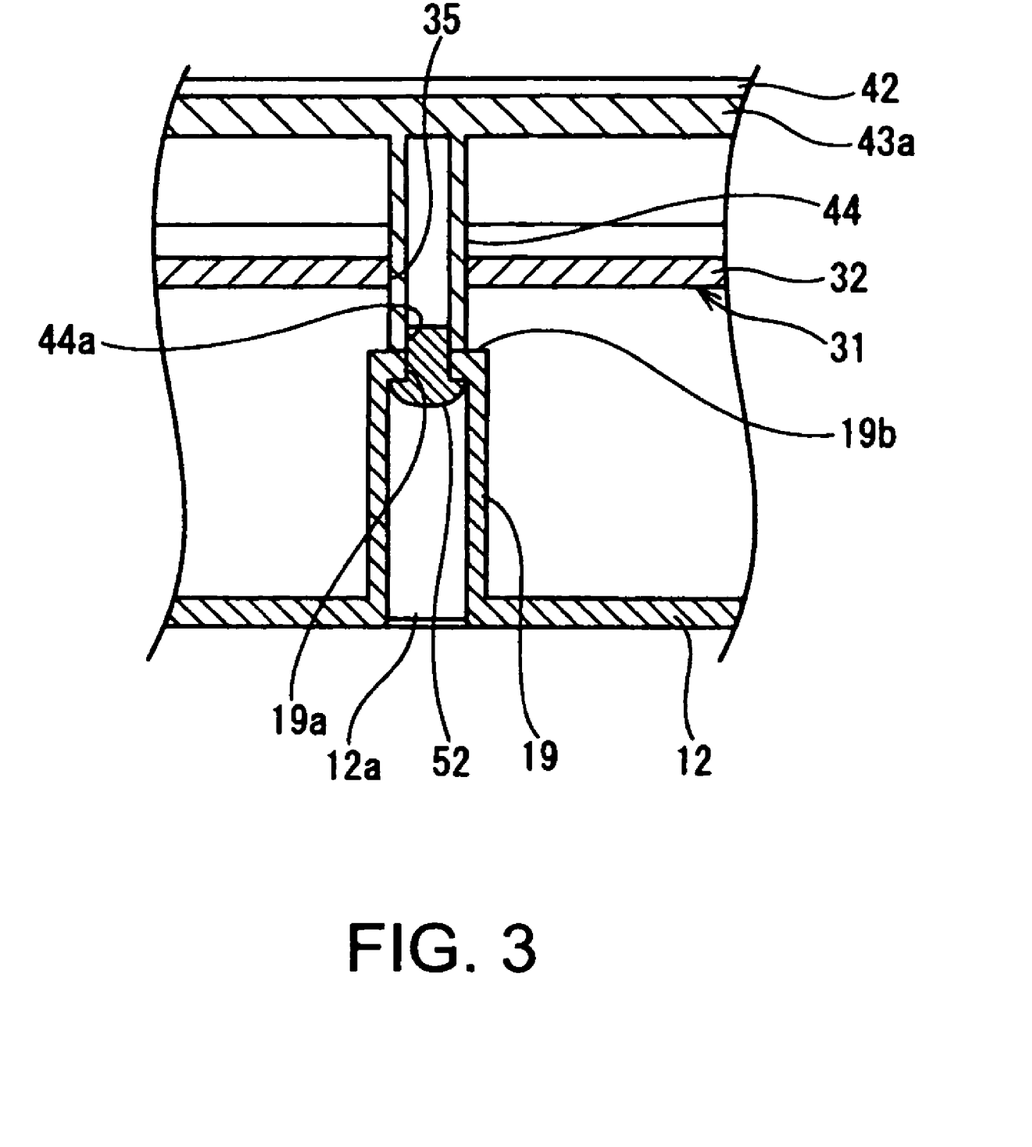
FIG. 3 is an enlarged section view of upper and lower reinforcement ribs in the electrical junction box shown in FIG. 1, illustrating a coupling and fixing condition of the ribs.

FIGS. 1 through 3 show a first embodiment of an electrical junction box 10. The electrical junction box 10 has a casing including an upper casing member 11 and a lower casing member 12, the upper and lower casing members 11 and 12 being made of an insulation resin material. The lower casing member 12 contains a printed board 31 and a bus bar laminated element 41 above the printed board 31. The upper casing member 11 is mounted on and locked in the lower casing member 12 to cover an upper side of the bus bar laminated element 41.

Connector containing portions 14, fuse containing portions (not shown), and relay containing portions (not shown) are juxtaposed on an upper side of the upper casing member 11 to form a containing section 13 for electrical components.

As shown in FIG. 2, a positioning rib 17 extends down from a rear side of the upper casing member 11. The positioning rib 17 is formed into a tubular body having an internal threaded hole 17a in a lower open end thereof.

The bus bar laminated element 41 is formed by laminating a plurality of bus bars 42 and insulation plates 43 alternately. An upper reinforcement rib 44 extends down from a rear side of a lowermost stage insulation plate 43a out of the insulation plates 43.

In more detail, the upper reinforcement rib 44 extends down from the rear side of the lowermost stage insulation plate 43a out of the insulation plates 43 at a location below the electrical component containing section 13. The upper reinforcement rib 44, as shown in FIG. 3, is formed into a tubular body having an internal threaded hole 44a in a lower open end thereof.

As shown in FIG. 1, a pushing rib 45 extends down from the rear side of the lowermost stage insulation plate 43a and is spaced laterally from the upper reinforcement rib to contact with an upper side of the printed board 31.

The insulation plates 43 that constitute the bus bar laminated element 41, as shown in FIG. 2, are provided with positioning holes 46a and 46b in a position corresponding to the positioning rib 17 on the upper casing member 11. The positioning holes 46a and 46b are communicated with each other in a vertical direction. Internal diameters of the positioning holes 46a and 46b are substantially the same as an external diameter of the positioning rib 17.

The printed board 31 includes an insulation board 32 and a wiring pattern 33 formed on the insulation board 32.

The insulation board 32 is provided with a positioning hole 34 at a location corresponding to the positioning rib 17 that extends down from the upper casing member 11. An internal diameter of the positioning hole 34 is substantially the same as an external diameter of the positioning rib 17.

As shown in FIGS. 1 and 3, the printed board 31 is provided with a reinforcement rib through-hole 35 at a location corresponding to the upper reinforcement rib 44 and being spaced from the positioning hole 34. An internal diameter of the reinforcement rib through-hole 35 is substantially the same as an external diameter of the upper reinforcement rib 44.

A lower reinforcement rib 19 extends up from a bottom surface of the lower casing member 12 and opposes the upper reinforcement rib 44. As shown in FIG. 3, the lower reinforcement rib 19 is formed into a tubular body having an external diameter greater than an external diameter of the upper reinforcement rib 44. The lower reinforcement rib 19 is provided with an upper central part with a threaded hole 19a. An internal diameter of the threaded hole 19a is substantially the same as an internal threaded hole 44a in the upper reinforcement rib 44.

In order to assemble the electrical junction box 10 having the above components, first the upper reinforcement rib 44 extending down from the lowermost stage insulation plate 43a in the bus bar laminated element 41 is inserted into the reinforcement rib through-hole 35 in the printed board 31 to attach the printed board 31 to the plate 43a. Second, the upper casing member 11 covers the bus bar laminated element 41 from an upper side of the element 41. As shown in FIG. 2, the positioning rib 17, extending down from the upper casing member 11, is inserted into the positioning holes 46a, 46b in the bus bar laminated element 41 and the positioning hole 34 in the printed board 31. A screw 51 is engaged with the threaded hole 17a in the positioning rib 17 from a rear side of the printed board 31.

Thus, the printed board 31 and bus bar laminated element 41 are initially positioned in and secured to the upper casing member 11.

Next, the lower casing member 12 covers the printed board 31 from a rear side of the board 31, and the upper and lower casing members 11 and 12 are coupled to each other.

Then, as shown in FIG. 3, the upper reinforcement rib 44 that projects through a rear side of the reinforcement rib through-hole 35 in the printed board 31 is brought into contact with a top end surface 19b of the lower reinforcement rib 19 on the lower casing member 12. A screw 52 is inserted into the lower reinforcement member 19 through a screw insertion whole 12a in the lower casing member, with the threaded hole 44a in the upper reinforcement rib 44 and the threaded hole 19a in the lower casing member 19 communicates with each other. The screw 52 is engaged with the threaded holes 19a and 44a to couple and secure the upper and lower reinforcement ribs 44 and 19 to each other.

Thus, the printed board 31, bus bar laminated element 41, and lower casing member 12 are positioned and fixed to each other.

As shown in FIG. 3, the electrical junction box 10 assembled above connects and fixes the upper and lower reinforcement ribs 44 and 19 at the location below the electrical component containing section 13 so that the ribs 44 and 19 cannot move in vertical and horizontal directions. Accordingly, since the reinforcement ribs 44 and 19 can bear a stress that the upper casing member 11 should bear when fitting and inserting the connectors or the like, it is possible to prevent or reduce breakage of the upper casing member and the electrical components, such as connectors.

Even if the upper casing member 11 is subjected to a stress that might deform the member 11 downward, the lowermost stage insulation plate 43a in the bus bar laminated element 41 that is supported by the reinforcement ribs 44 and 19 should reduce deformation of the upper casing member 11. Since the limited deformation should not affect the printed board 31 disposed below the bus bar laminated element 41, it is possible to prevent or reduce the possibility of breaking the wiring pattern 33 on the delicate printed board 31. Furthermore, since the pushing rib 45 extending down from the rear side of the lowermost stage insulation plate 43a can assist in maintaining the space between the printed board 31 and the lowermost stage insulation plate 43a, as shown in FIG. 1, the pushing rib 45 may also prevent breakage of the printed board 31.

In addition, coupling and fixing of the upper and lower casing members 44 and 19 can position and secure the printed board 31 with respect to the lower casing member 12 and bus bar laminated element 41.

Similarly, the positioning rib 17 can position and secure the printed board 31 and bus bar laminated element 41 with respect to the upper casing member 11. Consequently, workability and precision in assembly may be enhanced and holes to be provided in the printed board 31 and bus bar laminated element 41 may be reduced, thereby contributing to downsizing of the electrical junction box.

Figure 4:
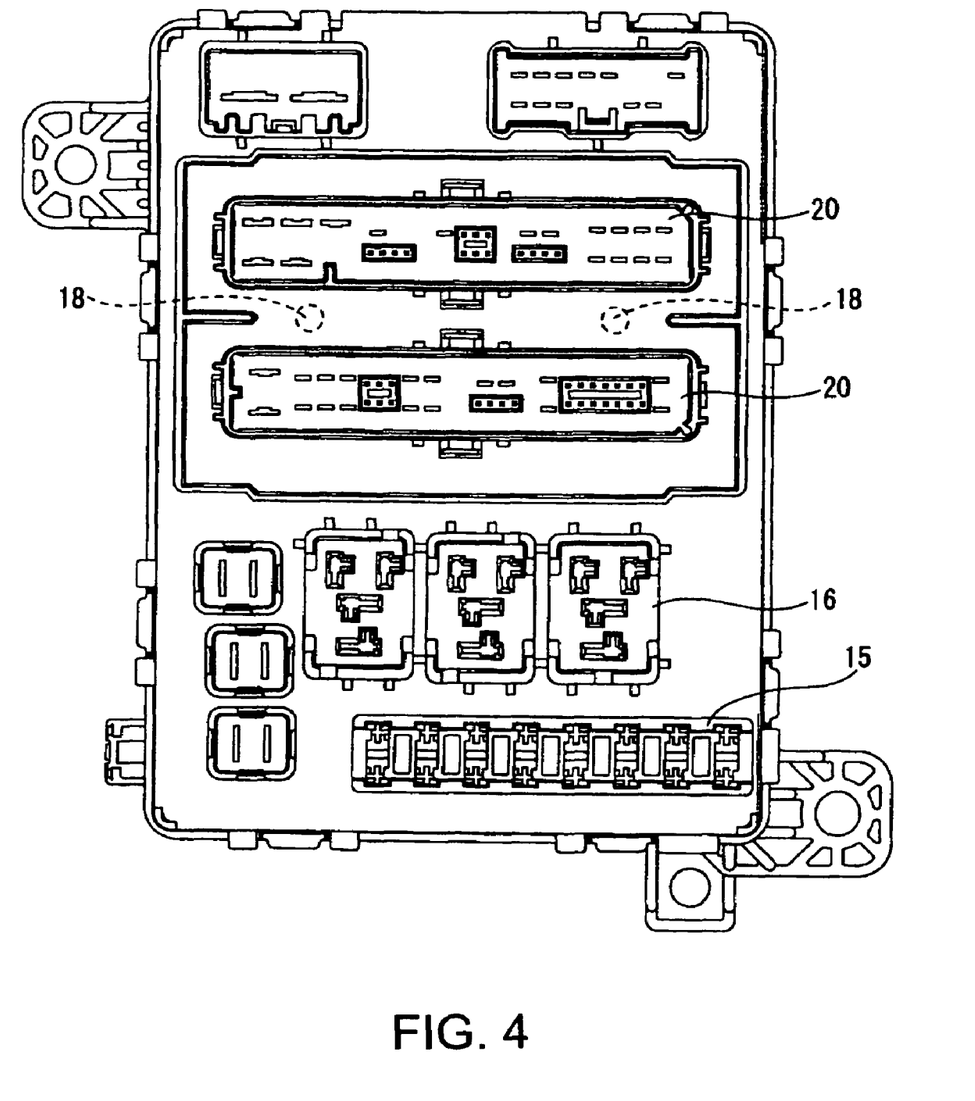
FIG. 4 is a plan view of a second embodiment of an electrical junction box upper casing member.
Figure 5:
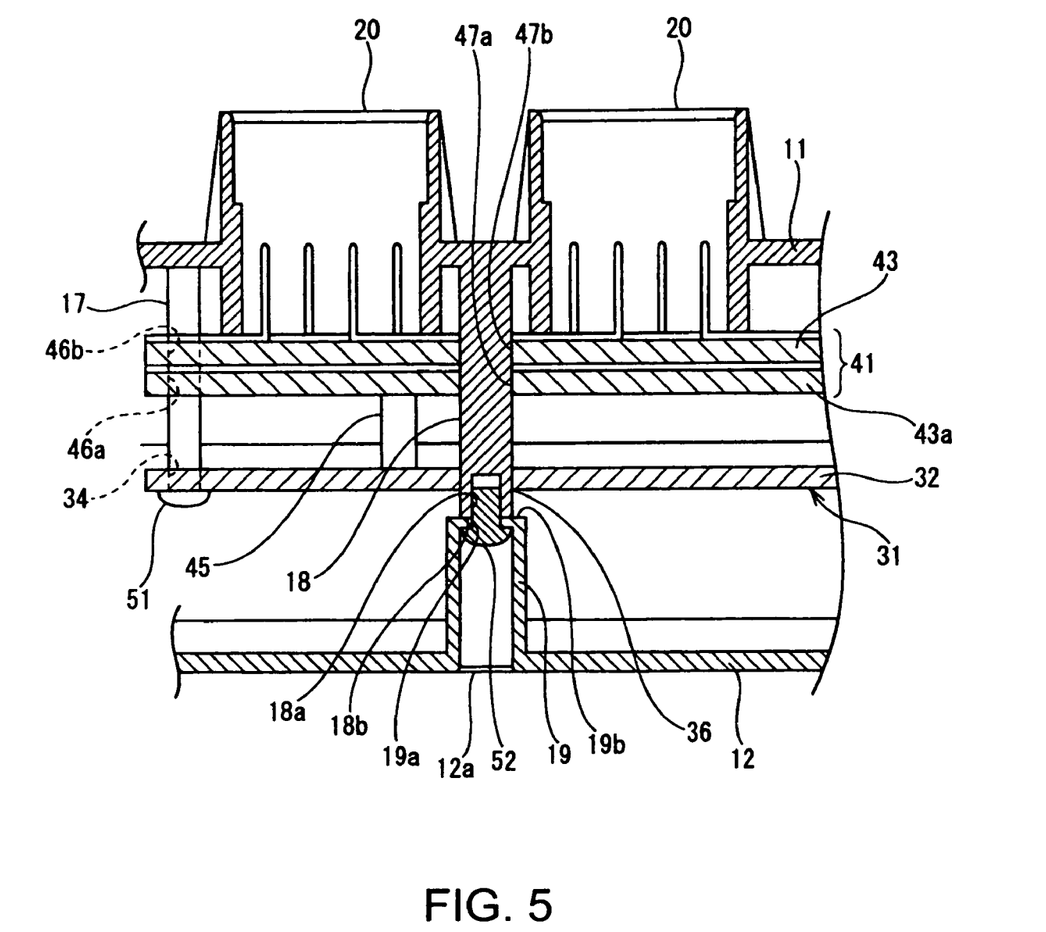
FIG. 5 is an enlarged section view of a main part of the electrical junction box shown in FIG. 4.

FIGS. 4 and 5 show a second embodiment of the electrical junction box.

In the second embodiment, two multi-pole connector containing portions are juxtaposed on the upper side of the upper casing member 11. Upper reinforcement ribs 18 extend down from the upper casing member 11. Fuse containing portions 15 and relay containing portions 16 are also juxtaposed on the upper side of the upper casing member 11.

Since the other structures in the second embodiment are the same as those in the first embodiment, the same numerals are given to the same elements or parts and explanations of them are omitted here.

In addition to the positioning rib 17, the upper reinforcement ribs 18 extend down from the rear side of the upper casing member 11 below a space between the multi-pole connector containing portions 20 on the opposite sides of the portions 20 in their longitudinal directions. As shown in FIG. 5, each of the upper reinforcement ribs 18 is formed into a bar-like configuration having a circular cross section and a threaded hole 18a in a lower end 18b. The lower reinforcement ribs 19 extend up from a bottom surface of the lower casing member 12 in a position opposed to the upper reinforcement ribs 18, respectively. Each of the lower reinforcement ribs 19 is formed into a tubular body having a diameter larger than the upper reinforcement ribs 18.

As shown in FIG. 5, the insulation plates 43 that constitute a part of the bus bar laminated element 41 are provided with reinforcement rib through-holes 47a and 47b at locations corresponding to the upper reinforcement ribs 18. The through-holes 47a and 47b communicate with each other in a vertical direction. Internal diameters of the reinforcement rib through-holes 47a and 47b are substantially the same as an external diameter of each upper reinforcement rib 18.

The upper casing member 11 is provided with positioning holes 46a and 46b at locations corresponding to the positioning rib 17. This is similar to the structure in the first embodiment.

As shown in FIG. 5, the printed board 31 is provided with a reinforcement rib through-hole 36 at a location corresponding to the upper reinforcement rib 18 in the upper casing member 11. An internal diameter of the reinforcement rib through-hole 36 is substantially the same as an external diameter of the upper reinforcement rib 18.

The upper casing member 11 is provided with a positioning hole 34 at a location corresponding to the positioning rib 17. This is similar to the structure in the first embodiment.

In the second embodiment, first a screw 51 is engaged with the positioning rib 17 from the rear side of the printed board 17 to position and fix the upper casing member 11, printed board 31 and bus bar laminated element 41. Second, the lower casing member 12 covers the printed board 31 from the rear side of the printed board 31. Then, the upper and lower casing members 11 and 12 are coupled to each other. Next, as shown in FIG. 5, the lower end surface 18b of the upper reinforcement rib 18 that extends down from the rear side of the reinforcement through-hole 36 in the printed board 31 is brought into contact with the upper end surface 19b of the lower reinforcement rib 19. A screw 52 is inserted into the lower casing member 19 through a screw insertion hole 12a in the lower casing member 12, with the threaded hole 18a in the upper reinforcement rib 18 and the threaded hole 19a in the lower reinforcement rib 19 communicating with each other. The screw 52 is engaged with the threaded holes 19a and 18a to couple and secure the upper and lower reinforcement ribs 18 and 19 to each other.

Thus, the printed board 31, bus bar laminated element 41, and upper and lower casing members 11 and 12 are positioned and fixed to each other.

In the second embodiment, since the upper and lower reinforcement ribs 18 and 19 can directly support the upper and lower casing members 11 and 12, the ribs 18 and 19 can bear substantially all stresses caused when inserting and fitting the connectors or the like. Consequently, deflection or deformation is not substantially caused in the upper casing member 11 and the possibility of breakage of the printed board may be effectively reduced or prevented.

Although an inserting force caused when a multi-pole connector is fitted into the multi-pole connector containing portion 20 may be greater than an inserting force of a single-pole connector, since each of the upper reinforcement ribs 18 is disposed on each location corresponding to each space between the many multi-pole connector containing portions, the upper and lower reinforcement ribs 18 and 19 can effectively bear the larger stress caused by inserting the multi-pole connector into the portion 20.

Furthermore, since the upper and lower reinforcement ribs 18 and 19 are disposed on each location corresponding to each space between the many multi-pole connector containing portions and are spaced away from each other, a relatively few reinforcement ribs 18 and 19 may achieve an effect of absorbing inserting stress effectively, such that upsizing of the electrical junction box may not be required.

Although the invention has not been described with reference to specific embodiments, these embodiments should be viewed as illustrative and not limiting. Various modifications, substitutions and improvements are possible within the spirit and scope of the invention.

What is claimed is:

1. An electrical junction box, comprising:
   a casing including a lower casing member and an upper casing member adapted to be mounted on said lower casing member;
   a printed board contained in said lower casing member;
   a bus bar laminated element, including bus bars and insulation plates, contained in said upper casing member above said printed board;
   a containing section having juxtaposed containing portions for electrical components including at least one of a connector, fuse, or a relay and provided on an upper side of said upper casing member above said bus bar laminated element;
   an upper reinforcement rib extending downward from a lowermost stage insulation plate in said bus bar laminated element at a location below said containing section, said upper reinforcement rib being inserted into a through-hole in said printed board to extend downward toward a bottom surface of said lower casing member; and
   a lower reinforcement rib extending upward from the bottom surface of said lower casing member to oppose said upper reinforcement rib,
   said upper and lower reinforcement ribs being located below said containing portions for electrical components of said containing section to absorb inserting stress, and
   a bottom end surface of said upper reinforcement rib being in contact with a top end surface of said lower reinforcement rib.

2. The electrical junction box according to claim 1, wherein said upper reinforcement rib extending downward from said upper casing member or from said insulation plate in said bus bar laminated element is provided on a location below an area between a plurality of multi-pole connector containing portions juxtaposed on the upper side of said upper casing member.

3. The electrical junction box according to claim 2, wherein a positioning rib extends downward from the rear side of said upper casing member to penetrate said bus bar laminated element and is inserted into a hole in said printed board and secured to said printed board by a fixing means.

4. The electrical junction box according to claim 3, wherein a pushing rib extends downward from the lowermost stage insulation plate in said bus bar laminated element to contact with an upper side of said printed board, defining a given space between said lowermost stage insulation plate and said printed board.

5. The electrical junction box according to claim 1, wherein a positioning rib extends downward from the rear side of said upper casing member to penetrate said bus bar laminated element and is inserted into a hole in said printed board and secured to said printed board by a fixing means.

6. The electrical junction box according to claim 5, wherein a pushing rib extends downward from the lowermost stage insulation plate in said bus bar laminated element to contact with an upper side of said printed board, defining a given space between said lowermost stage insulation plate and said printed board.

7. The electrical junction box according to claim 1, wherein a pushing rib extends downward from the lowermost stage insulation plate in said bus bar laminated element to contact with an upper side of said printed board, and defines a given space between said lowermost stage insulation plate and said printed board.

8. The electrical junction box according to claim 2, wherein a pushing rib extends downward from the lowermost stage insulation plate in said bus bar laminated element to contact with an upper side of said printed board, defining a given space between said lowermost stage insulation plate and said printed board.

9. An electrical junction box, comprising:
a casing including a lower casing member and an upper casing member adapted to be mounted on said lower casing member;
a printed board contained in said lower casing member;
a bus bar laminated element including bus bars and insulation plates and contained in said upper casing member above said printed board;
a containing section having juxtaposed containing portions for electrical components including at least one of a connector, fuse, or a relay and provided on an upper side of said upper casing member above said bus bar laminated element;
an upper reinforcement rib extending downward from a rear side of said upper casing member at a location below said containing section through said bus bar laminated element and printed board toward a bottom surface of said lower casing member; and
a lower reinforcement rib extending upward from the bottom surface of said lower casing member to oppose said upper reinforcement rib,
said upper and lower reinforcement ribs being located below said containing portions for electrical components of said containing section to absorb inserting stress, and
a bottom end surface of said upper reinforcement rib being in contact with a top end surface of said lower reinforcement rib.

10. The electrical junction box according to claim 9, wherein said upper reinforcement rib extending downward from said upper casing member or from said insulation plate in said bus bar laminated element is provided on a location below an area between a plurality of multi-pole connector containing portions juxtaposed on the upper side of said upper casing member.

11. The electrical junction box according to claim 10, wherein a positioning rib extends downward from the rear side of said upper casing member to penetrate said bus bar laminated element and is inserted into a hole in said printed board and secured to said printed board by a fixing means.

12. The electrical junction box according to claim 11, wherein a pushing rib extends downward from the lowermost stage insulation plate in said bus bar laminated element to contact with an upper side of said printed board, defining a given space between said lowermost stage insulation plate and said printed board.

13. The electrical junction box according to claim 10, wherein a pushing rib extends downward from the lowermost stage insulation plate in said bus bar laminated element to contact with an upper side of said printed board, defining a given space between said lowermost stage insulation plate and said printed board.

14. The electrical junction box according to claim 9, wherein a positioning rib extends downward from the rear side of said upper casing member to penetrate said bus bar laminated element and is inserted into a hole in said printed board and secured to said printed board by a fixing means.

15. The electrical junction box according to claim 14, wherein a pushing rib extends downward from the lowermost stage insulation plate in said bus bar laminated element to contact with an upper side of said printed board, defining a given space between said lowermost stage insulation plate and said printed board.

16. The electrical junction box according to claim 9, wherein a pushing rib extends downward from the lowermost stage insulation plate in said bus bar laminated element to contact with an upper side of said printed board, defining a given space between said lowermost stage insulation plate and said printed board.

* * * * *